W. A. TURBAYNE.
DYNAMO ELECTRIC MACHINE.
APPLICATION FILED MAY 31, 1916.

1,324,989.

Patented Dec. 16, 1919.
2 SHEETS—SHEET 1.

Witnesses
David H. Tinkler
Ralph Munden

Inventor
William A. Turbayne
By Raymond H. Van Ness
Attorney

W. A. TURBAYNE.
DYNAMO ELECTRIC MACHINE.
APPLICATION FILED MAY 31, 1916.

1,324,989.  Patented Dec. 16, 1919.
2 SHEETS—SHEET 2.

Witnesses
David H. Tinkler
Ralph Munden

Inventor
William A. Turbayne
By Raymond H. Van Nest
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

1,324,989.    Specification of Letters Patent.    Patented Dec. 16, 1919.

Application filed May 31, 1916. Serial No. 100,836.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

The present invention relates to starting and generating dynamo-electric machines.

More particularly the present invention relates to dynamo-electric machines which are used in the starting and lighting systems of automobiles, in which systems the dynamo-electric machine is used as a motor to start an internal combustion engine and is adapted to be driven by said internal combustion engine to supply current for charging a storage battery. In such systems it is requisite that the dynamo-electric machine should develop a high torque under motoring conditions. It is also requisite that the dynamo-electric machine also operate efficiently as a generator, though the value of the current output should be held down so that the battery may not be subjected to an excessively high charging current.

The present invention relates to dynamo-electric machines in which said regulating action is inherent within the machine itself.

An object of the present invention is to provide a dynamo-electric machine which will operate efficiently either as a motor or as a generator.

A further object is to provide a dynamo-electric machine which, when acting as a generator, will be inherently regulated to hold its current output within predetermined limits.

Other objects will be apparent as the description proceeds.

Referring to the drawings:—

For the purpose of simplifying the explanation, an embodiment of the present invention has been chosen for illustration employing two poles. It will be clear, however, that the invention is equally applicable to multipolar forms of dynamo-electric machines.

Figure 1:
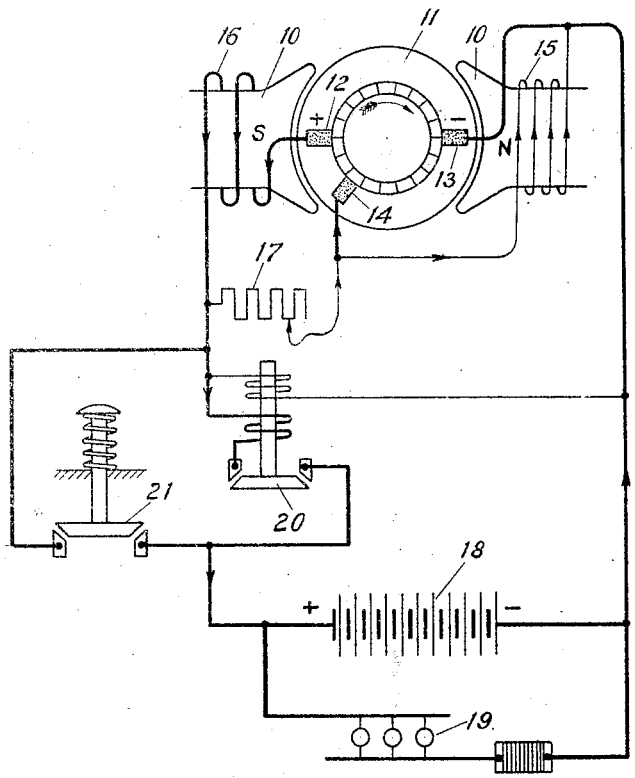
Figure 1 represents an embodiment of the present invention.

Referring particularly to Fig. 1, a dynamo-electric machine is provided with a pair of pole pieces 10, 10, and an armature 11. Said armature 11 is provided with a pair of brushes 12 and 13, constituting the main brushes of the machine. An auxiliary brush 14 is also provided, placed back of the positive brush 12. Connected between the negative brush 13 and the auxiliary brush 14 is a shunt field winding 15, which is shown as concentrated on the right hand pole 10. The series winding 16, shown as concentrated on the left hand pole 10, is wound to produce, under generating conditions, an effect opposing the shunt field winding 15. Between the outer terminal of the series winding 16 and the auxiliary brush 14 is connected an adjustable resistance 17, whereby the regulating action may be varied at will.

The storage battery 18 is represented as in position to be charged by the dynamo-electric machine. Connected across the storage battery 18 is a lamp circuit 19. An automatic switch 20 of the usual construction may be provided in one of the leads connecting the dynamo electric machine with the battery. Said automatic switch may be bridged by a starting switch 21.

Figure 2:
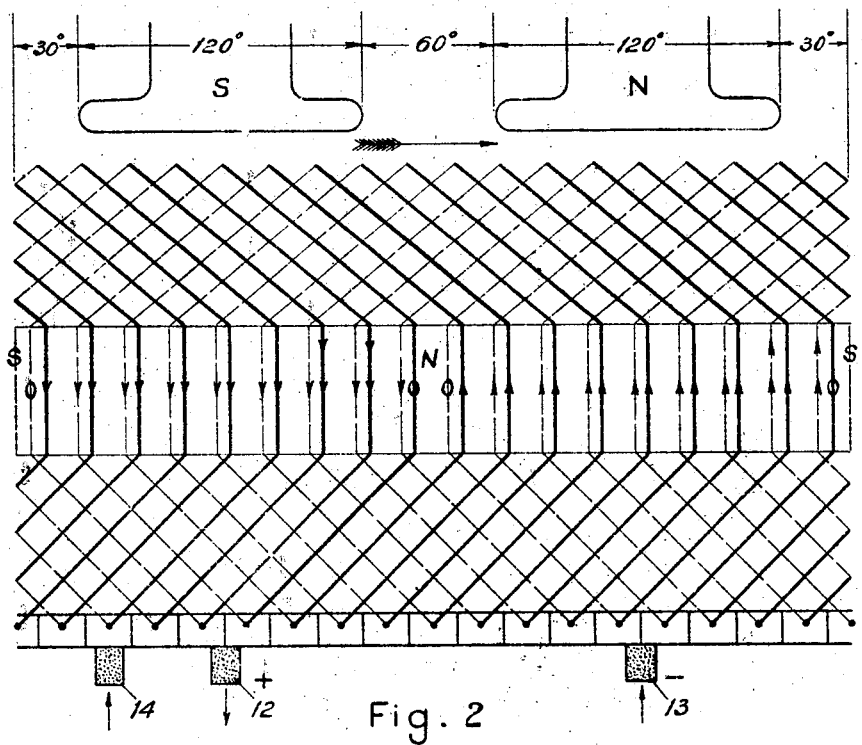
Fig. 2 represents diagrammatically the direction of currents in the various armature conductors.
Figure 3:
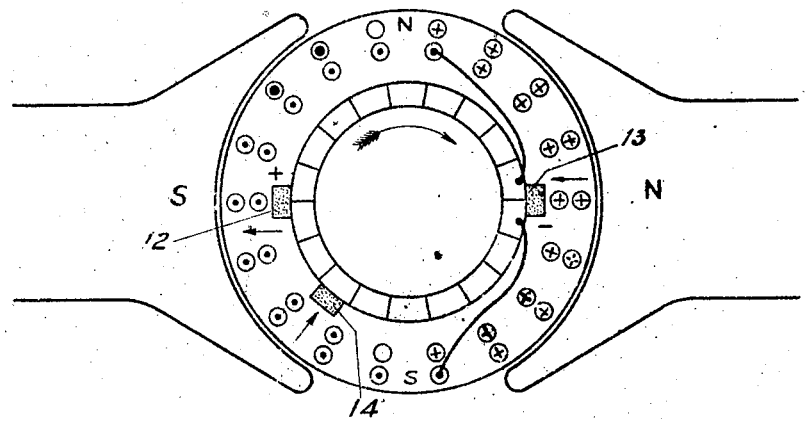

Fig. 2 illustrates the direction of current in the armature conductors when the machine acts as a generator. In Fig. 2 the conductors with the double arrow-heads are those interposed between brushes 12 and 14. These conductors are represented in Fig. 3 by the conductors having the heavy crosses and dots. These crosses and dots are used conventionally to indicate respectively that the current is flowing away from and toward the observer.

A mode of operation of the present invention is substantially as follows:—

When it is desired to operate the dynamo-electric machine as a motor for engine starting purposes, the operator will close the starting switch 21, allowing current to pass from the positive side of the battery through the series winding 16 and the armature 11 of the dynamo electric machine. Current will also pass through the shunt winding 15 in a direction to aid series winding 16. The machine will therefore develop a high torque as a cumulatively wound motor.

When the armature is being rotated as a generator, the machine will build up in the usual manner as a regular shunt machine.

and until the armature delivers current to the external circuit, the potential difference existing between brushes 12 and 14 will be negligible, so that substantially the full developed voltage will be impressed across the shunt field winding. When the machine develops a voltage sufficient for charging the storage battery, the automatic switch will close in the well known manner. Current will now be delivered to the battery 18 and the lamp circuit 19. The resulting armature reaction will bring about distortion of the flux in the direction of rotation. Consequently, the potential difference across brushes 12 and 14 will be increased, the potential on brush 12 predominating over that on brush 14. At the same time, the potential across brushes 14 and 13 will be reduced in the same degree, for the reason that the sum of the voltages existing across brushes 12 and 14 and 14 and 13 must equal the voltage across brushes 12 and 13. This action results in three effects which act to reduce the effective flux and therefore tend to hold the delivered output constant. First, there will be superimposed on the work circuit current flowing through the series opposing winding 16, the current which flows in the local circuit from brush 12 through the series winding adjustable resistance 17, brush 14 and armature conductors interposed between brushes 14 and 12. The demagnetizing current acting upon the opposing winding 16 will therefore be greater than the current in the external work circuit. Second, the reduction in voltage across brushes 13 and 14 will bring about a reduction in the current flowing in the shunt field winding 15. Third, the current in the armature conductors impressed between brushes 12 and 14 will exert a de-magnetizing effect, illustrated in Figs. 2 and 3. This is particularly well illustrated in Fig. 3, wherein said conductors are illustrated by the heavy crosses and dots.

One embodiment of the present invention has been described in detail for the purpose of illustrating the same. Many modifications will occur to those skilled in the art. It is desired to cover in this case all such modifications that fall within the scope of the invention as defined by the appended claims.

Having described my invention, what I claim as new and desire to secure by Letters Patent of the United States, is—

1. In a dynamo-electric machine, in combination, an armature provided with a pair of main brushes, a series winding connected at one end to one of said main brushes, an auxiliary brush, and a shunt winding connected between said auxiliary brush and the other of said main brushes, the other end of said series winding being connected to said auxiliary brush.

2. A dynamo-electric machine provided with a shunt winding and a series winding adapted to act differentially to said shunt winding during generating conditions, a pair of main brushes, and an auxiliary brush, said shunt winding being connected between said auxiliary brush and one of said main brushes and said auxiliary brush being electrically connected through said series winding to the other main brush.

3. A dynamo-electric machine provided with a rotatable armature, a shunt field winding and a series field winding adapted to act differentially to said shunt field winding during generating conditions, a pair of main brushes, and an auxiliary brush spaced slightly behind one of said main brushes, said shunt winding being connected between said auxiliary brush and one of said main brushes and said auxiliary brush being electrically connected through said series field winding to the other main brush.

4. A dynamo-electric machine provided with a shunt field winding and a series winding adapted to act differentially thereto during generating conditions, a pair of main brushes, an auxiliary brush, and a resistance member, said shunt winding being connected between said auxiliary brush and one of said main brushes and said series winding and said resistance member being connected in series between said auxiliary brush and said other main brush.

5. A dynamo-electric machine provided with a rotatable armature, a shunt field winding and a series field winding adapted to act differentially to said shunt field winding during generating conditions, a pair of main brushes, an auxiliary brush spaced slightly behind one of said main brushes, and a resistance member, said shunt winding being connected between said auxiliary brush and one of said main brushes and said series winding and said resistance member being connected in series between said auxiliary brush and the other main brush.

6. An inherently regulated generator provided with a shunt field winding, a series field winding, an armature provided with conductors, said shunt field winding being connected to be excited from certain of said conductors, and an auxiliary circuit including said series field winding and the remainder of said conductors whereby said series field winding and said remaining conductors may oppose said shunt field winding.

In witness whereof, I have hereunto subscribed my name.

WILLIAM A. TURBAYNE.